US012380741B2

(12) United States Patent
Chang et al.

(10) Patent No.: US 12,380,741 B2
(45) Date of Patent: Aug. 5, 2025

(54) LINKAGE PIN MONITORING AND GALLING PROTECTION

(71) Applicant: Caterpillar Inc., Peoria, IL (US)

(72) Inventors: Yang-Kyoo Chang, Dunlap, IL (US); Byron D Collis, Chicago, IL (US); Brian Howson, Bolingbrook, IL (US); Joel P Busker, Plainfield, IL (US); Christopher Arnold Junck, Kobe (JP); Huapei Wan, Dunlap, IL (US); Jie Lu, Peoria, IL (US); Brian Naing, Homestead, FL (US)

(73) Assignee: Caterpillar Inc., Peoria, IL (US)

( * ) Notice: Subject to any disclaimer, the term of this patent is extended or adjusted under 35 U.S.C. 154(b) by 257 days.

(21) Appl. No.: 18/198,795

(22) Filed: May 17, 2023

(65) Prior Publication Data

US 2024/0386753 A1    Nov. 21, 2024

(51) Int. Cl.
*G07C 3/00* (2006.01)
*G01M 13/00* (2019.01)

(52) U.S. Cl.
CPC ............... *G07C 3/00* (2013.01); *G01M 13/00* (2013.01)

(58) Field of Classification Search
CPC ........ G07C 3/00; G01M 13/00; G01M 13/04; E02F 9/268; E02F 9/006
See application file for complete search history.

(56) References Cited

U.S. PATENT DOCUMENTS

| 11,276,501 B1* | 3/2022 | Brook ..................... G16H 20/70 |
| 2017/0356164 A1* | 12/2017 | Recker ................... E02F 9/2054 |
| 2022/0139117 A1* | 5/2022 | Zhang ................. G05B 23/0283 |
| | | 701/29.4 |
| 2023/0307143 A1* | 9/2023 | Brook ................... G06F 18/214 |
| 2024/0387055 A1* | 11/2024 | Brook .................... G16H 50/30 |

FOREIGN PATENT DOCUMENTS

| JP | S60225045 | 11/1985 |
| JP | 2005122650 A * | 5/2005 |

* cited by examiner

*Primary Examiner* — Eric Blount

(57) ABSTRACT

This disclosure describes, in part, systems and techniques for monitoring linkage joints of machines, such as earthmoving machines, using on-board sensors of the machines to identify linkage joints at risk of galling. The systems and techniques involve gathering sensor data and determining a galling risk score for each linkage joint. The galling risk score may then be used to alert an operator and/or maintenance system to determine when to take remedial action and/or perform maintenance while also avoiding costly downtime from galling failures.

20 Claims, 7 Drawing Sheets

LINKAGE PIN MONITORING AND GALLING PROTECTION

TECHNICAL FIELD

The present disclosure relates generally to monitoring wear of linkage pins at linkage joints of a machine and, for example predicting wear and lifetime of the linkage pins using one or more models.

BACKGROUND

Many earth-working machines, such as, for example, loaders, tractors, and excavators, include linkage pin assemblies at the joints between parts of the machine that move relative to each other during operation of the machine. Such linkage pin assemblies include linkage pins that pivotally or rotatably support various structural members and other components of the machine relative to each other, and that withstand shear, tensile, compressive, and torsional stresses exerted on the structural members and other components during operation of the machine to perform work. Due to wear from abrasion and impacts experienced during use, the maintenance costs for these linkage pins and linkage pin assemblies often constitute a large percentage of the total costs associated with operating the earth-working machines.

One failure mode for linkage pin assemblies involves galling failure. Galling failure is known to occur during the sliding contact between the linkage pins and joint bushings or between the linkage pins and machine members in linkage pin joint assemblies, particularly under high load applications. High load applications, such as incurred on larger, heavy-duty machinery, have typically mitigated the risk of galling through the use of sleeve bearings positioned around the outer diameter surface of the linkage pins between the pins and the joint bushings. When galling occurs, the linkage pin and joint may both need to be replaced, which is a time-intensive procedure, particularly to replace the joint.

An example system for detecting galling of screw joints is described in Japanese Publication No. 60225045 (hereinafter referred to as the '045 document). In particular, the '045 document describes an apparatus for detecting galling of a threaded joint of a steel pipe by detecting a temperature of a pin and coupling at the joint during tightening of the pin. A sudden temperature change in the pin and/or threaded joint is indicative of galling occurring at the threaded connection.

Although the apparatus described in the '045 document is configured to detect an occurrence of galling at a joint including a threaded connection, the apparatus described in the '045 document is not configured to predict and/or prevent galling at a linkage pin joint based on sensor data from the machine to avoid galling at the joint, thereby avoiding replacement of the joint and/or pin due to the galling failure. As a result, the apparatus described in the '045 document is not configured to maximize the efficiency of the machines and avoid downtime due to time-intensive repair of galled pins and joints.

Examples of the present disclosure are directed toward overcoming the deficiencies described above.

SUMMARY

One general aspect includes a galling prediction and notification system for a machine. The galling machine includes a first portion of a first machine member defining a first bore, a second portion of a second machine member defining a second bore, and a linkage pin pivotally connecting the first machine member and the second machine member. The machine also includes a sensor configured to monitor the linkage pin and/or joint during operation of the machine. The machine further includes one or more processors and a non-transitory computer-readable medium operably connected to the one or more processors and storing instructions that, when executed by the one or more processors, cause the one or more processors to perform operations. The operations include receiving sensor data from the sensor, determining a first threshold for the sensor data based on the linkage pin, first machine member, and second machine member, determining a risk score for the linkage pin, the risk score associated with a risk of galling and based on the sensor data and the threshold, and generating an alert in response to the risk score being at or above a second threshold. Other embodiments of this aspect include corresponding computer systems, apparatus, and computer programs recorded on one or more computer storage devices, each configured to perform the actions of the operations.

Another general aspect includes a method for assessing galling risk of a linkage joint. The method includes receiving sensor data from a sensor of a machine, the sensor configured to measure the sensor data at a linkage pin rotationally connecting a first machine member with a second machine member. The method also includes determining, by a computing device of the machine, a threshold for the sensor data. The method further includes determining, by the computing device of the machine and using an algorithm that receives inputs of the sensor data and the threshold, a risk score associated with a risk of galling at the linkage pin. The method also includes generating an alert in response to the risk score being over a second threshold. Other embodiments of this aspect include corresponding computer systems, apparatus, and computer programs recorded on one or more computer storage devices, each configured to perform the actions of the method.

Another general aspect includes a non-transitory computer-readable medium storing instructions that, when executed by one or more processors, cause the one or more processors to perform actions. The actions include receiving sensor data from a sensor of a machine, the sensor configured to measure the sensor data at a linkage pin rotationally connecting a first machine member with a second machine member, determining, by a computing device of the machine, a threshold for the sensor data, determining, by the computing device of the machine and using an algorithm that receives inputs of the sensor data and the threshold, a risk score associated with a risk of galling at the linkage pin, and generating an alert in response to the risk score being over a second threshold.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts.

Figure 1:
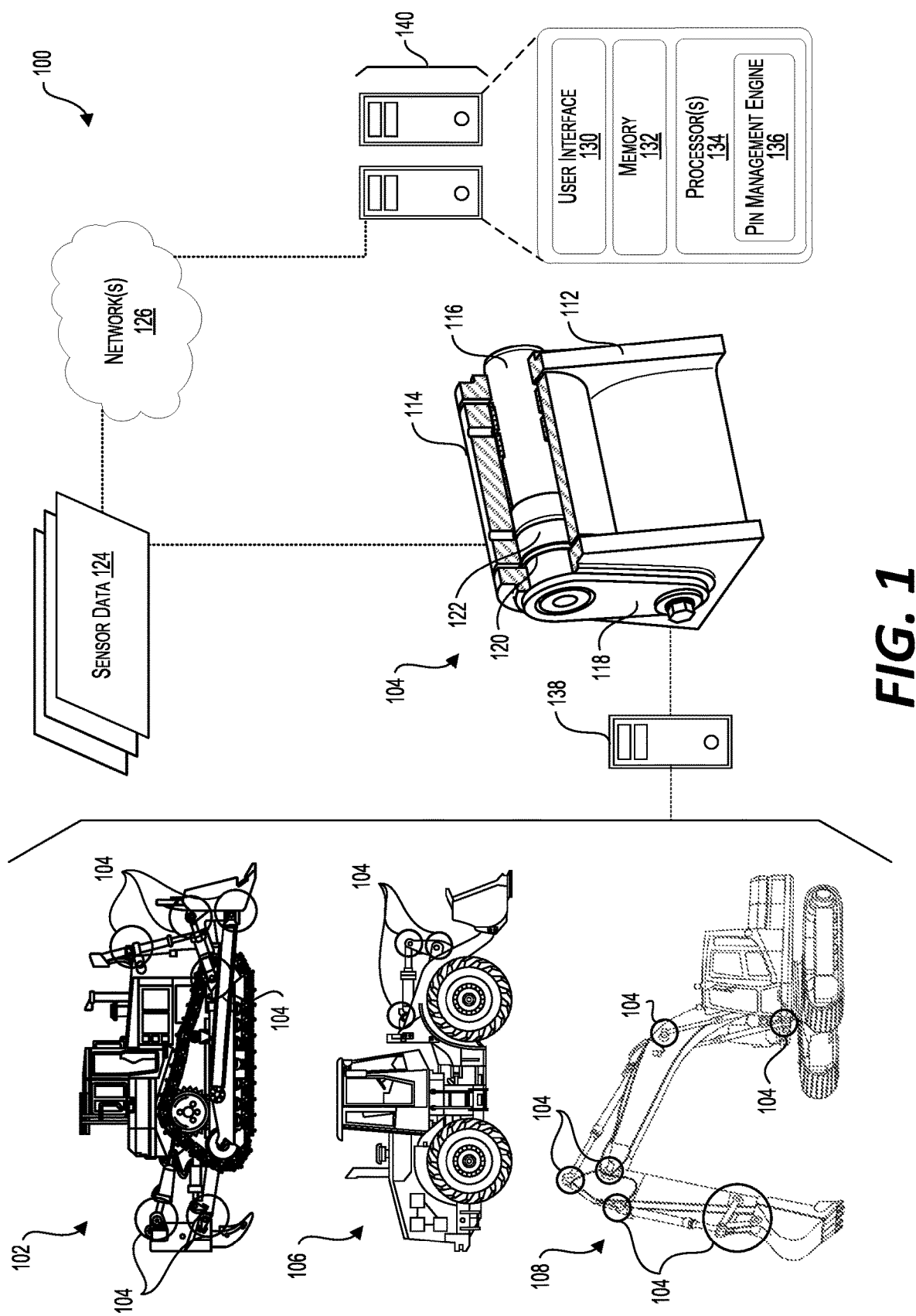
FIG. 1 illustrates a system for determining galling risk predictions and generating notifications for service of machines, according to at least one example.

FIG. 1 illustrates a system 100 for determining galling risk predictions and generating notifications for service of machines, according to at least one example. The system 100 may be implemented on a machine, such as an earth-moving or other such machine. The machines, machine, as the term is used herein, refers to a fixed or mobile machine that performs some type of operation associated with a particular industry, such as mining, construction, farming, etc. and operates between or within work environments (e.g., construction site, mine site, power plants, etc.). Non-limiting examples of machines include commercial machines, such as trucks, cranes, earth moving vehicles, mining vehicles, backhoes, material handling equipment, farming equipment, marine vessels, aircraft, and any type of movable machine that operates in a work environment. As shown in FIG. 1, machine 102, machine 106, and machine 108 (together "machines 102") are earth-moving machines. The types of machine illustrated in FIG. 1 is exemplary and not intended to be limiting. It is contemplated that the disclosed embodiments may implement any type of machine having linkages for connecting parts that rotate relative to one another.

The machine 102, machine 106, and machine 108 are illustrated as having linkage joints 104 that connect components, such as machine members, and enable relative rotation of the machine members. For instance, the linkage joints 104 may connect a first end of a hydraulic piston or other actuation mechanism to a fixed location on the machines such that as the piston extends, the linkage joint 104 may accommodate changes in the angle of the hydraulic piston. The linkage joints 104 may be positioned between a first machine member 112 and a second machine member 114 and allow rotational motion or oscillatory motion between the first machine member 112 and the second machine member 114. The linkage joints 104 include a linkage pin that rests in an opening or bore defined by the first machine member 112 and the second machine member 114. Linkage pin joints are common in earth-moving machines and other large machinery and equipment. The linkage pin 116 is cylindrical in shape and, in some applications, are made from hardened steel or other such materials. The linkage pin 116 is disposed in the linkage joint 104 where adjacent machine members meet and the linkage pin 116 provides a cylindrical bearing surface around which the members pivot. Linkage pin joints 104 typically include a linkage pin 116, one or more bearings 122, lubricants, seals 120, and retention components 118 for keeping the linkage joint 104 assembled while in use but also enabling maintenance and repair of the joint by removing the retention components 118.

One of the common failure modes of linkage joints 104 is galling, also known as adhesive wear. Galling failures catastrophically occur without warning when the linkage pin 116 and the bearing 122 are under heavy loads in frequent motion. As a result, machine owners experience unexpected downtimes and additional owning and operating costs. Galling risk is accelerated by operation issues, including insufficient lubrication as well as over-loading of the linkage pin 116 due to operator misuse. As such, the system 100 is used to automatically evaluates galling risk levels for the various linkage joints 104 of the machine 102, machine 106, or machine 108 during operation in real-time can be used to trigger preventative measures and avoid costly repairs and downtime.

Galling failure of the linkage pin 116 typically manifests as a weld between the linkage pin 116, the bearing 122, and/or the first machine member 112 and/or second machine member 114 as a result of high pressure and high temperature at the linkage joint 104. Galling failure may result in a catastrophic failure with unexpected downtime as entire joints must be removed and replaced. Instead, if galling can be predicted and anticipated before occurring, the linkage pin 116 may be replaced by removing the retention components 118, a fast and inexpensive process, to reduce machine downtime and service costs.

The bearing 122 may include a sleeve bearing disposed within the linkage joint 104 to provide an interior bearing surface between the machine members 112 and 114 and the linkage pin 116. The bearing 122 is tubular in shape and can be press fit into the linkage joint 104 or secured by other suitable mechanisms. As the adjacent members of a linkage pivot with respect to one another, the linkage pin's outer bearing surface bears against the inner surface of the bearing 122. Lubrication is maintained between the linkage pin and the inner surface of the bearing by the seal 120.

The bearing 122 is used as a sliding component against the linkage pin 116. Under certain load and motion conditions during repeated machine operation, however, the bearing 122 can become welded to the linkage pin 116. Then the bonded portions get detached from the original components, leaving rough surfaces and material on both the bearing 122 and linkage pin 116. This galling failure then accelerates the surface damage and causes consequent damage to the adjacent components, making the machine unusable until the entire linkage joint 104 is repaired. Because this linkage pin 116 and bearing 122 interface is enclosed in the linkage joint 104, unfortunately, by the time the galling failure is notices, there has already been significant failure that has resulted in damage to the surrounding structural or hydraulic components. Therefore, the system 100 described herein provides for early prediction and detection of conditions that may lead to galling and may be used to enable maintenance or replacement of linkage pins 116 and/or bearings 122 before galling occurs that may result in machine damage and extensive repairs.

The machines 102 includes a first computing device 138. In such examples, the first computing device 138 further includes a processor, a memory, and a user interface, among other components shown and described with respect to FIG. 7. The processor is an electronic controller that operates in a logical fashion to perform operations, execute control algorithms, store and retrieve data and other desired operations. The processor can include or access memory, secondary storage devices, processors, and any other components for running an application. The memory and secondary storage devices can be in the form of read-only memory (ROM) or random-access memory (RAM) or integrated circuitry that is accessible by the processor. Various other circuits can be associated with the processor such as power supply circuitry, signal conditioning circuitry, driver circuitry, and other types of circuitry. The user interface can comprise an analog, digital, and/or touchscreen display, and such a control interface is configured to display, for example, at least information related to the status of the machine, including the status of the linkage pins as shown and described with respect to FIG. 6. The user interface may also support other functions including, for example, sharing various operating data with one or more other machines or computing devices of the system 100.

The processor may be a single processor or other device, or can include more than one controller or processor configured to control various functions and/or features of the system 100. As used herein, the term "processor" is meant in its broadest sense to include one or more controllers, processors, and/or microprocessors that are associated with the system 100, and that can cooperate in controlling various functions and operations of the components (e.g., machines 102) of the system 100. The functionality of the processor can be implemented in hardware and/or software without regard to the functionality. The processor relies on data such as sensor data relating to the operating conditions of the machines 102 that can be stored in the memory associated with the processor.

The first computing device 138 is configured to facilitate interoperability between the components it contains, and to receive data sensed from sensors of the machines 102, such as temperature, pressure, and motion (e.g., velocity, acceleration, etc.) sensors of the machines 102. In some examples, the processor is configured to operate pursuant to instructions stored in the memory and, in some cases, the processor is configured to cause the user interface to display and/or otherwise provide information. In some examples, the second machine 108 includes a second computing device. In such examples, the second computing device includes the same, similar, and/or different components than the first computing device 138. Each of the machines 102 may have one or more dedicated computing devices that may operate in the same, similar, and/or different way as the first computing device 138 as described herein.

Figure 7:
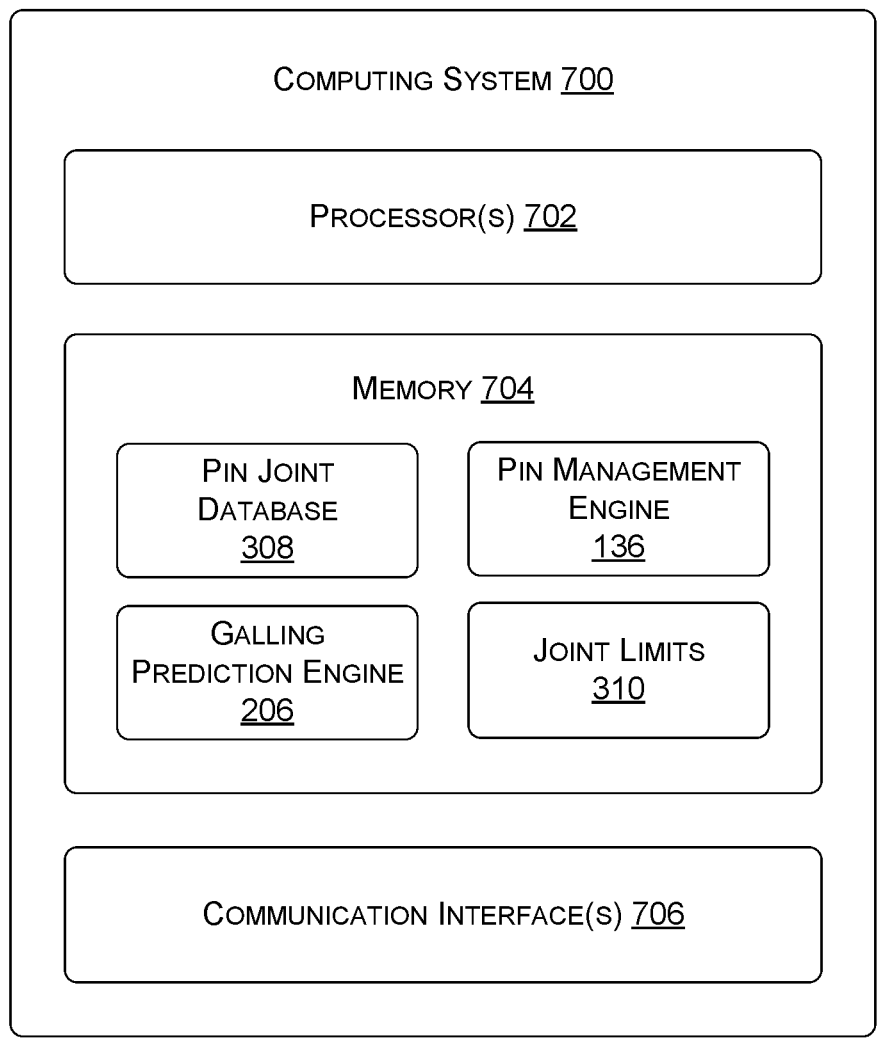
FIG. 7 illustrates an example system architecture for a computing system associated with the machinery and/or galling prediction system.

The second computing device 140 may be a fleet management computing device that has a structure similar or identical to that described with respect to the computing system 700 of FIG. 7. In some examples, the second computing device 140 may include a worksite controller computing device that manages one or more operations at a particular worksite. In some examples, the second computing device 140 may include a fleet management device configured to track and maintain records and status information for a fleet of machines. For instance, the second computing device 140 may be used to store service records, galling prediction scores, use information, and other such data that may be used to identify when maintenance is required for the machines 102 of the fleet.

In the example shown in FIG. 1, the first computing device 138 and the second computing device 140 are in communication and/or otherwise connected with each other via a network 126. The network 126 can be a local area network ("LAN"), a larger network such as a wide area network ("WAN"), or a collection of networks, such as the Internet. Protocols for network communication, such as TCP/IP, can be used to implement the network 126.

Although embodiments are described herein as using a network 126 such as the Internet, other distribution techniques can be implemented that transmit information via memory cards, flash memory, or other portable memory devices. The network 126 can implement or utilize any desired system or protocol including any of a plurality of communications standards. The desired protocols will permit communication between the various processors and computing devices of the components in system 100. Examples of wireless communications systems or protocols that can be used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications can be transmitted and received directly between the components of the system 100 (e.g., between machines). In other instances, the communications can be automatically routed without the need for re-transmission by remote personnel.

In further examples, computing devices of two or more of the machines 102 are in communication and/or otherwise connected with each other via the network 126. In some further examples, the network 126 further connects one or more of an additional computing device(s) and/or one or more of a satellite(s). Thus, as described herein, the network 126 is configured to facilitate communication between any one or more machines disposed at and/or remote from the worksite and/or machines 102, computing platforms at and/or remote from the worksite, other worksites and/or material processing and/or holding plants, and the like. The additional computing device(s) can also comprise components of the system 100. Such additional computing device(s) can comprise, for example, mobile phones, laptop computers, desktop computers, and/or tablets of project managers (e.g., foremen) overseeing daily paving operations at the worksite and/or at the paving material plant. Such additional computing device(s) can include and/or be configured to access one or more processors, microprocessors, memory, or other components. In such examples, the additional computing device(s) have components and/or functionality that is similar to and/or the same as the first computing device 138.

As shown in FIG. 1, the system 100 also includes a computing platform 140 in communication and/or otherwise connected to the network 126. In such examples, the computing platform 140 includes a user interface 130 and a memory 132. The user interface 130 provides a centralized location (i.e., back office) an ability to perform actions (i.e., manually, semi-autonomously, and/or fully autonomously) including data input, determination of object classification (e.g., object type, object identity, etc.), determination of remediation procedures, and determination of machines to alert and/or instruct to perform the remediation. The memory 132 can store computer readable media, machine learning algorithmic instructions, compiled sensor data, work plan data for the machines, worksite data, and the like. In some further examples, the computing platform 140 includes a processor 134 which includes a pin management engine 136. The pin management engine 136 may comprise a software component of and/or associated with the processor 134 (e.g., an executable software component stored in the memory 132) or a hardware component of the processor 134. In some examples, the processor 134 performs tasks provided by stored instructions in the memory 132 including, but not limited to, initiating the pin management engine 136 which determines a risk score and prediction for galling at linkage joints 104 of the machines 102, from one or more sensors disposed on one or more machines.

The system 100 uses sensors of the machines 102 to gather sensor data 124 that may be consumed by a pin management engine 136 embodied at the first computing device 138 or the computing platform 140 to detect operating conditions at the linkage pins and thereby determine galling risk at each linkage joint 104. In some examples, the sensor data may include temperature data, load data (e.g., related to a pressure at a hydraulic piston associated with the linkage joint 104), motion data (e.g., a rate of rotation or velocity at the linkage joint 104), and other such data.

In some examples, the sensors may include a thermocouple at or near the linkage joint 104 that is used to monitor temperature data as part of the sensor data 124. In some examples, a thermal camera may be used to monitor temperature data for one or more of the linkage joints 104 of the machines 102. For instance, a thermal camera may be connected to a cab of the machine 102 and pointed towards the front of the machine able to capture thermal data of the front of the machine. A positioning system, such as a linkage tracking system of the machine 102 that tracks positions and locations of the linkage joints 104 and/or a machine learning algorithm trained for object recognition may be used to identify the portions of the temperature data associated with the various linkage joints 104. Other temperature sensors may be implemented and are contemplated to gather temperature data at or adjacent the linkage joints 104 to estimate or determine a temperature of the linkage pin 116.

In some examples, the sensors may include a pressure sensor or load sensor configured to detect a cylinder pressure of a hydraulic cylinder associated with a linkage joint 104 as part of the sensor data 124 (e.g., a hydraulic cylinder or other actuation device coupling adjacent machine members joined at the linkage joint 104). In some examples, a load cell may be used to determine pressure at the linkage joint 104. The position and orientation of the cylinder may be used to calculate the position of the linkages of the machines 102. The calculation may be performed by the first computing device 138.

In some examples, the sensors may include a motion sensor for determining motion data as part of the sensor data for the linkage joints 104. The motion sensor may include a position sensor, encoder, or other such sensor capable of determining a rate of change in the rotational position at the linkage joints 104. In some examples, the position of the linkage over time may be used to calculate the motion. For instance, the lift, tilt, angle, and/or position of the hydraulic cylinders that actuate the linkage joints 104 may be used to calculate the motion at the linkage joint. The calculation may be performed by the first computing device 138.

The system 100 may use the sensor data 124, communicated to the computing platform 140 over the network 126 to determine a galling risk score for each of the linkage joints 104. In some examples, the computing platform 140 may include a remote computing device separate and remote from the machines 102. In some examples, the computing platform 140 may include the computing device(s) of the machines 102. The pin management engine 136 is configured to determine a galling risk score for each of the linkage joints 104 of the machines 102 and to report and/or cause additional actions based on the galling risk score. The galling risk score may be determined using the sensor data 124 and based on pressure, motion, and/or temperature limits for each of the linkage joints as determined by historical data. The historical data may include indications of galling as well as temperature data, load data, and/or motion data associated with the indications of galling. In some examples, the historical data may be used to determine threshold limits for pressure, motion, and/or temperature data. The threshold limits may be represented, for example, in FIG. 4 as a two dimensional plot or may also be presented as a three-dimensional surface. When the sensor data 124 approaches and/or passes beyond the two-dimensional or three-dimensional thresholds, the pin management engine 136 may generate an alert of galling, calculate a galling risk score based on the sensor data 124, and/or adjust operation of the machines 102 to reduce a risk of galling until the linkage joint 104 can be investigated and/or maintained (e.g., by replacing the linkage pin 116).

The system 100 temperature sensors of the machines 102 to detect changes in linkage joint 104 temperatures. Temperature sensors may be capable of providing additional confidence with respect to galling risk in addition to pressure and motion data, as rising linkage joint 104 temperature may be a direct precursor to imminent galling failure. In some examples, temperature may also be indicative of galling occurring and therefore be used to identify when a linkage joint 104 should be taken out of operation for service. Therefore, using load data, motion data, and temperature data may enable an accurate prediction of galling risk for each linkage joint 104 on the machines 102.

In some examples, a first threshold may be established at which the system 100 generates an alert of the galling risk. A second threshold may be established at which level the galling risk is above a threshold such that galling is anticipated in the near future. In some instances, the pin management engine 136 may generate alert data in response to approaching (e.g., based on the rate of change) the first threshold and/or meeting or exceeding the threshold. The pin management engine 136 may further generate an additional alert in response to approaching and/or meeting the second threshold. In some examples, the pin management engine 136, in response to meeting or exceeding the second threshold, may cease or reduce activity at the identified linkage joint 104. For example, the pin management engine may prevent rotation and/or cap a maximum rotation speed and/or pressure at the linkage joint 104 to prevent damage to the linkage joint 104 until a replacement of the linkage pin 116 may be installed. In this manner, costly repairs to the linkage joint 104 may be avoided, while other operations of the machines 102 may continue to function. Therefore, the machines may continue to be used, without causing damage to the particular linkage joint 104.

In some examples, the pin management engine 136 may implement one or more algorithms and/or machine learned models to determine a galling risk score based on the sensor data 124. The machine learned model may determine the galling risk score and may also determine a confidence score associated with the galling risk score. In this manner, the machine learned model may use, for example pressure and motion sensor data to determine the galling risk score, but in response to the confidence score being below a threshold, may determine a second galling risk score using additional sensor data (e.g., from a second period of time and/or from a different sensor or type of sensor). The confidence score may then be correspondingly updated by the machine learned model.

In some examples, the remediation engine 146 includes or has access to one or more machine learned models (e.g., data models) configured to determine the remediation plan for the object 119. As part of determining the remediation plan, one or more machine learning models may be used for object detection characteristic estimation, object classification, or other tasks described herein. Machine learning may take empirical data as input, such as data from the sensors of the machines as well as object data and machine location. Machine learning systems may take advantage of data to capture characteristics of interest that have an unknown underlying probability distribution or weighting. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to learn which performance characteristics are preserved during a localization process and validate localized content when the performance characteristics are preserved.

Machine learning may be performed using a wide variety of methods of combinations of methods, such as contrastive learning, supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, Fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

In some examples, the machine learning models may include access to or versions of multiple different machine learning models that may be implemented and/or trained according to the techniques described herein. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The one or more machine learning algorithms may be trained using training examples. The training examples may include example inputs of sensor data from a variety of sensors as well as desired outputs associated with the inputs, the desired outputs identifying the objects, obstacles, or type of object. Training the machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison.

Figure 2:
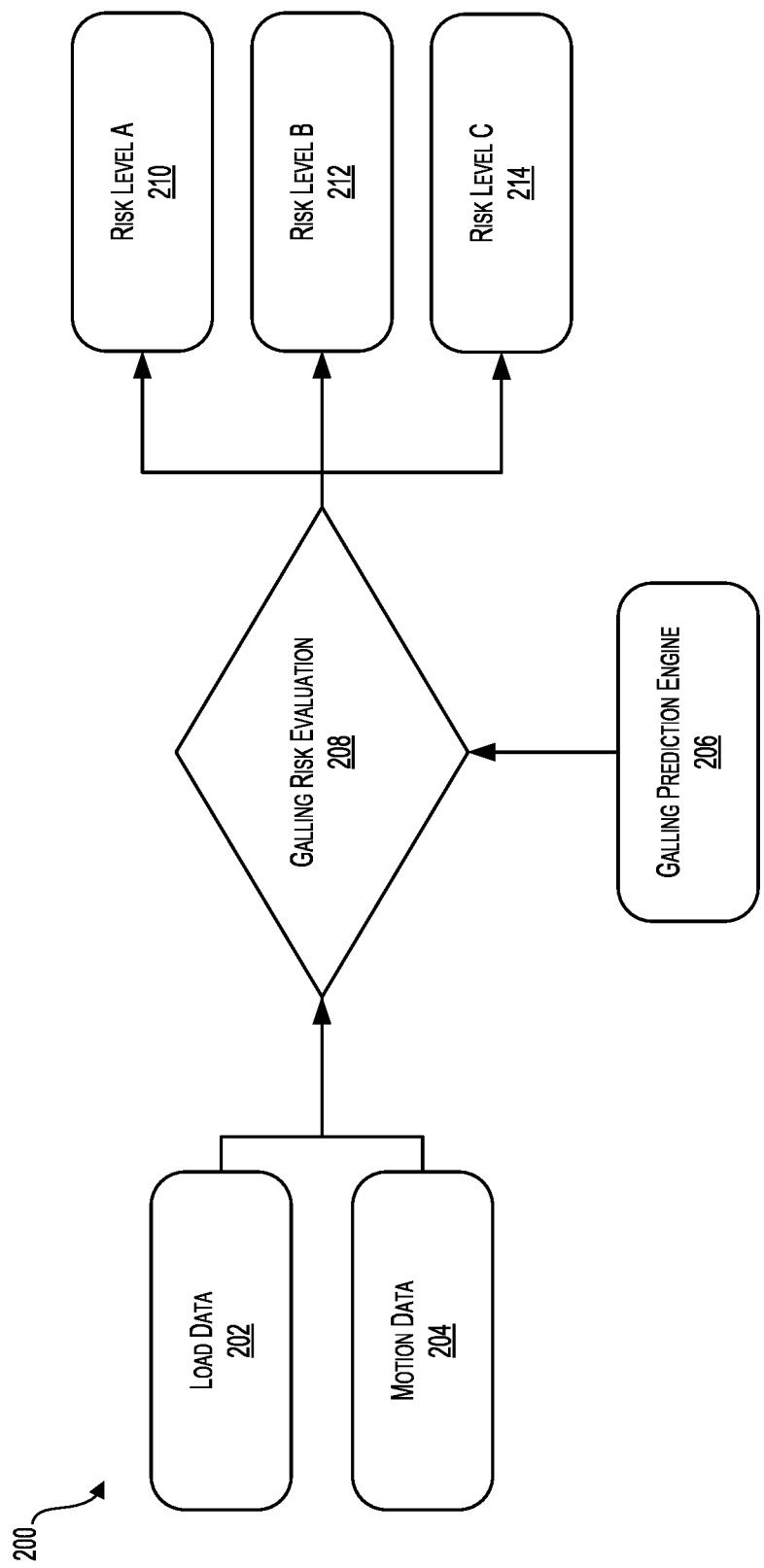
FIG. 2 illustrates a process for generating risk level predictions for linkage pin galling based on load and motion data, according to the present disclosure.

FIG. 2 illustrates a process 200 for generating risk level predictions for linkage pin galling based on load and motion data, according to the present disclosure. The process 200 may be implemented by the pin management engine 136 of FIG. 1 in some examples. The process 200 may be completed by one or more computing devices, in communication with or on-board the machines 102. The process 200 may be used to determine a galling risk score and associated confidence score. The galling risk score may then be used to identify a risk level for a particular linkage joint 104 of the machines 102. The process 200 may be used to generate a galling risk evaluation 208 as a result of load data 202 and motion data 204. In some examples, the galling risk evaluation 208 may be based on only one of the sensor data inputs.

Figure 4:
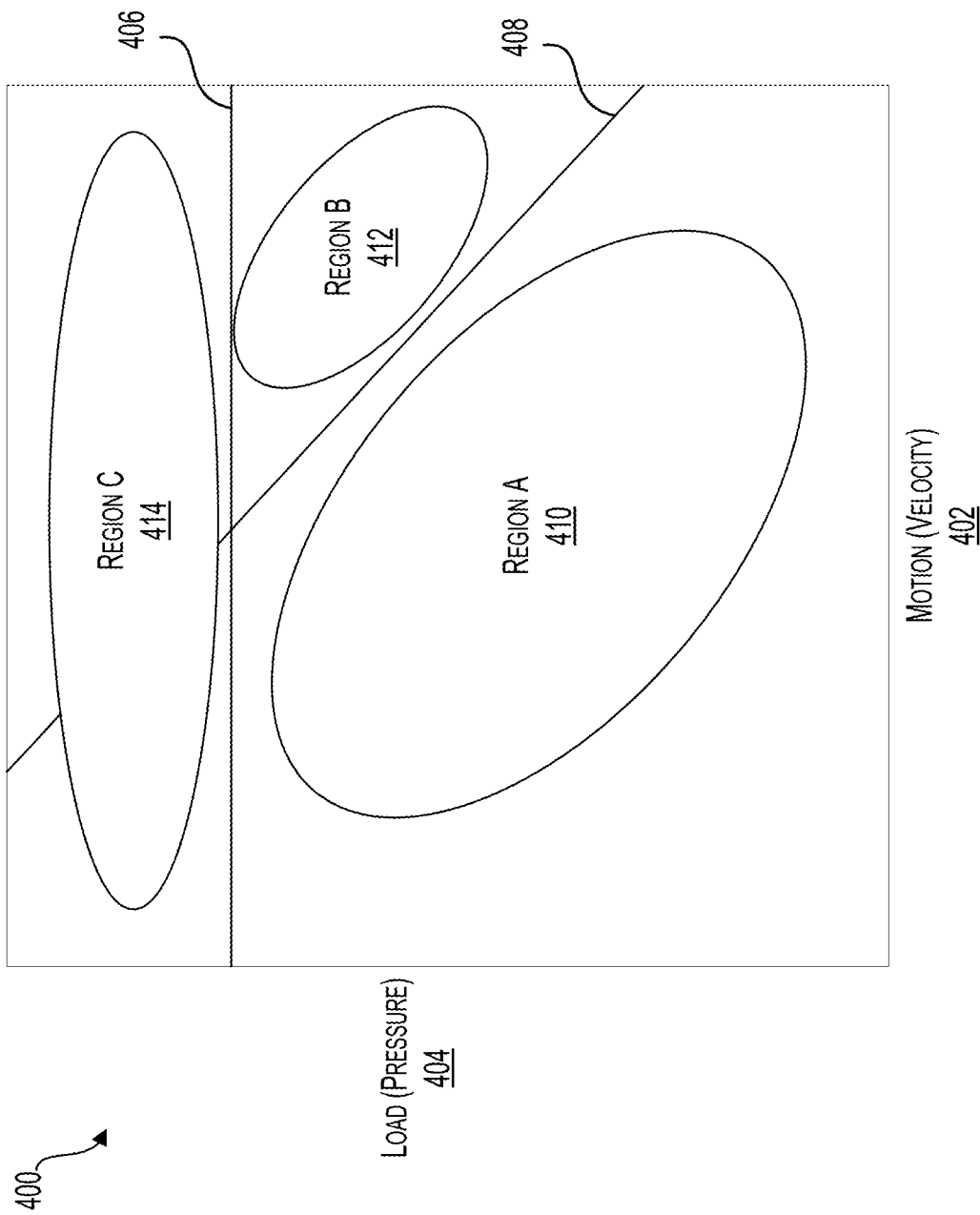
FIG. 4 illustrates a plot of load data and motion data indicating limits for risks of galling based on historical data, according to the present disclosure.

The galling risk evaluation 208 may be a result of inputs from load data 202 and motion data 204. The load data 202 may include a load at the joint, such as based on a hydraulic actuator pressure associated with the joint or other load measurement. The motion data 204 may include rotational velocity of the joint, movement with respect to the ground, directional movement with respect to gravity (e.g., with or against gravity), and acceleration data. The inputs may include sensor data 124 and may be gathered from one or more sensor systems of the machines 102. The galling risk evaluation 208 may also be generated based on the galling prediction engine 206. The galling prediction engine 206 may consume the sensor data 124, such as the load data 202 and the motion data 204 to generate a prediction of galling risk for the linkage joints 104. In some examples, the galling prediction engine 206 may include a plot, such as shown and described with respect to FIG. 4 showing galling indications as a function of motion data and load data. In some examples, the galling prediction engine 206 may use the load data 202 and the motion data 204 to identify a region of the plot 400 and determine a risk of galling based on the region where the data points lie. As described above, the galling prediction engine may also implement a machine learned approach to determine the galling risk. The galling prediction engine 206 may, for example, be a component of the pin management engine 136.

In some examples, the risk of galling may be categorized into different levels of risk. The galling risk evaluation 208 may be output as a binary indication, either at risk for galling or at low or no risk for galling based on the risk score being above or below a threshold and/or the motion data and load data indicating a region of plot 400 indicative of no galling. In some examples, the galling risk evaluation 208 may output levels of risk, such as risk level A 210, risk level B 212, and risk level C 214. The risk levels may be based on thresholds for the risk scores, with a first span of risk scores assigned to risk level A 210, a second span of risk scores assigned to risk level B 212, and a third span of risk scores assigned to risk level C 214.

In an illustrative example, risk level A 210 may be indicative of a high risk of galling, based on the risk score being above a threshold score, such as above seventy-five on a risk score scale out of one hundred, or some other threshold. The risk level A 210 may result in a first set of remediation actions being taken by the computing device of the machine 102, including alerting an operator, alerting a maintenance system, and/or slowing or ceasing operation of the machine 102 and/or linkage joint 104 identified. Risk level B 212 may be associated with a low risk, such as a range of risk scores between twenty-five and seventy-five. In response to risk level B 212, the computing device may generate an alert to an operator and/or maintenance system of the status. Risk level C 214 may be associated with no risk of galling, such as a range of risk scores under twenty-five. The computing device may not take any action in response to risk level C 214. In some examples, upon determination of the galling risk evaluation 208, regardless of the risk level, the computing system may report the risk score to a maintenance or logging system for keeping records related to the operations of the machines 102.

Figure 3:
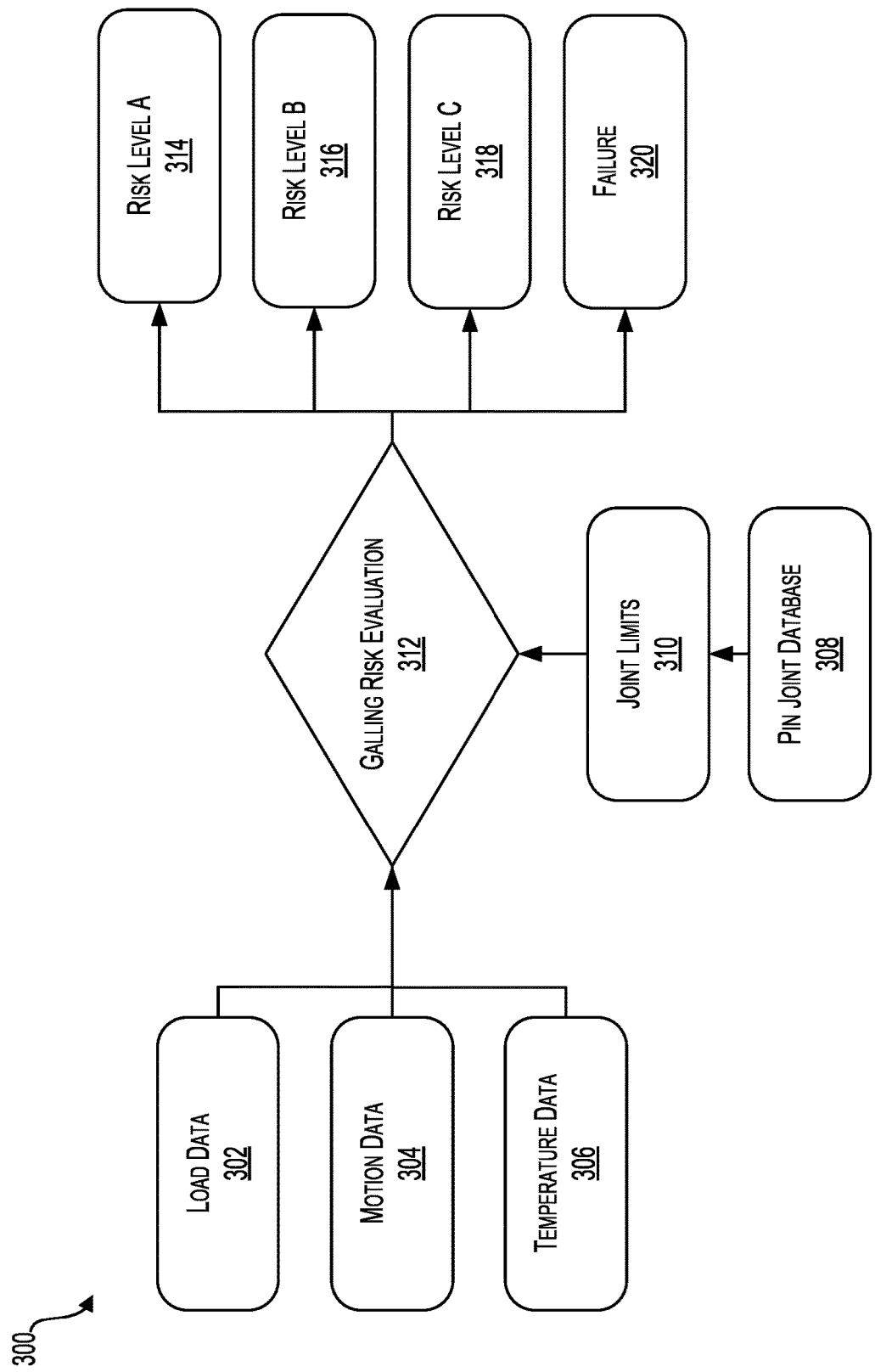
FIG. 3 illustrates a process for generating risk level predictions for linkage pin galling based on load, temperature, and motion data, according to the present disclosure.

FIG. 3 illustrates a process 300 for generating risk level predictions for linkage pin galling based on load, temperature, and motion data, according to the present disclosure. The process 300 may be implemented by the pin management engine 136 of FIG. 1 in some examples. The process 300 may be completed by one or more computing devices, in communication with or on-board the machines 102. The process 300 may be used to determine a galling risk score and associated confidence score. The galling risk score may then be used to identify a risk level for a particular linkage joint 104 of the machines 102. The process 300 may be used to determine a galling risk evaluation 312 using load data 302, motion data 304, and temperature data 306. In some examples, the galling risk evaluation 312 may be made based on one, two, or all three of the sensor data inputs. In some examples, additional inputs, such as operating time and environmental conditions may also be provided as inputs to the process 300.

The galling risk evaluation 312 may be a result of inputs from load data 302, motion data 304, and temperature data 306. The inputs may include sensor data 124 and may be gathered from one or more sensor systems of the machines 102. The galling risk evaluation 312 may also be generated based on joint limits 310 for particular joints of the machines 102. For instance, a pin joint database 308 may include data for different linkage pin configurations, arrangements, materials, diameters, and other such differences that may result in varying linkage joint galling predictions. From the pin joint database 308, the joint limits 310 may be accessed for a particular linkage joint 104. The pin management engine 136 may consume the sensor data 124 and the joint limits 310 to generate a prediction of galling risk for the linkage joints 104. In some examples, the pin management engine 136 may include a plot, such as shown and described with respect to FIG. 4 showing galling indications as a function of motion data, temperature data, and load data (e.g., a three-dimensional plot with threshold surfaces).

In some examples, the risk of galling determined at the galling risk evaluation 312 may be categorized into different levels of risk. The galling risk evaluation 312 may be output as a binary indication, either at risk for galling or at low or no risk for galling based on the risk score being above or below a threshold and/or the motion data and load data indicating a region of plot 400 indicative of no galling. In some examples, the galling risk evaluation 312 may output levels of risk, such as risk level A 314, risk level B 316, risk level C 318, as well as an indication of failure 320. The risk levels may be based on thresholds for the risk scores and/or directly from the sensor data, with a first span of risk scores assigned to risk level A 314, a second span of risk scores assigned to risk level B 316 and a third span of risk scores assigned to risk level C 318. Failure 320 may also be determined, for example at a third span of risk scores and/or based on sensor data including temperature data indicating a rise in temperature at the linkage joint 104 above a steady-state temperature.

The risk levels and/or indications of failure may be consumed by on-board systems and/or off-board systems associated with the machines 102. Examples of ways that the risk levels may be consumed may include alerts to operators, maintenance systems, altering operation of the device, fault codes, on-board displays, adjusting a lubrication system or setting associated with the linkage joint 104, or other such actions. In some examples, where the machine 102 is configured with an auto-lubrication system configured to deliver lubricant to different systems, such as linkage joints 104, of the machine 102, the computing system may respond to various risk levels by increasing an amount or rate of lubricant delivered to the linkage joint 104.

FIG. 4 illustrates a plot 400 of motion data 402 and load data 404 indicating limits for risks of galling based on historical data, according to the present disclosure. The plot 400 is divided into particular regions based on historical data gathered relating to indications of galling. For example, when galling is detected and/or determined, the motion data 402 and the load data 404 when the galling occurred may be plotted to the plot 400 with annotations. Annotations of load data and motion data that did not result in galling may also be added to the plot 400. In this manner, based on the annotation (e.g., galling indicated vs. no galling indicated), the regions for various risks may be determined. and thresholds 406 and 408 may be determined. As data is gathered, for various data points along the motion data 402 and load data 404 axes, the data points may be tagged or annotated with indications of galling and/or galling risk scores. Collections of the data points may be gathered and identified into region A 410, region B 412, and region C 414.

Threshold 406 may indicate a seizure limit for the linkage joints 104. The seizure limit may be a limit (at a particular pressure level) at or above which the linkage pin 116 is expected to seize based on the load, independent of the motion data 402. Accordingly, region C 414 may be indicative of galling failure as a result of exceeding the seizure limit for the linkage joints 104. The seizure limits may be determined based on historical data. The data points falling in region C 414 may be identified as a result of being indicative of galling failure independent of the motion data 402.

Threshold 408 may indicate a load-motion threshold that defines a boundary between region A 410 and region B 412. Region A 410 may be indicative of no galling present, detected, or predicted while region B 412 may be a collection of points (that may include some portion of region C 414) where galling is present, detected, or predicted for the linkage joints 104. Though the thresholds 406 and 408 are illustrated as linear, they may have other shapes or profiles based on the particular distribution of data points in region A 410, region B 412, and region C 414.

Figure 5:
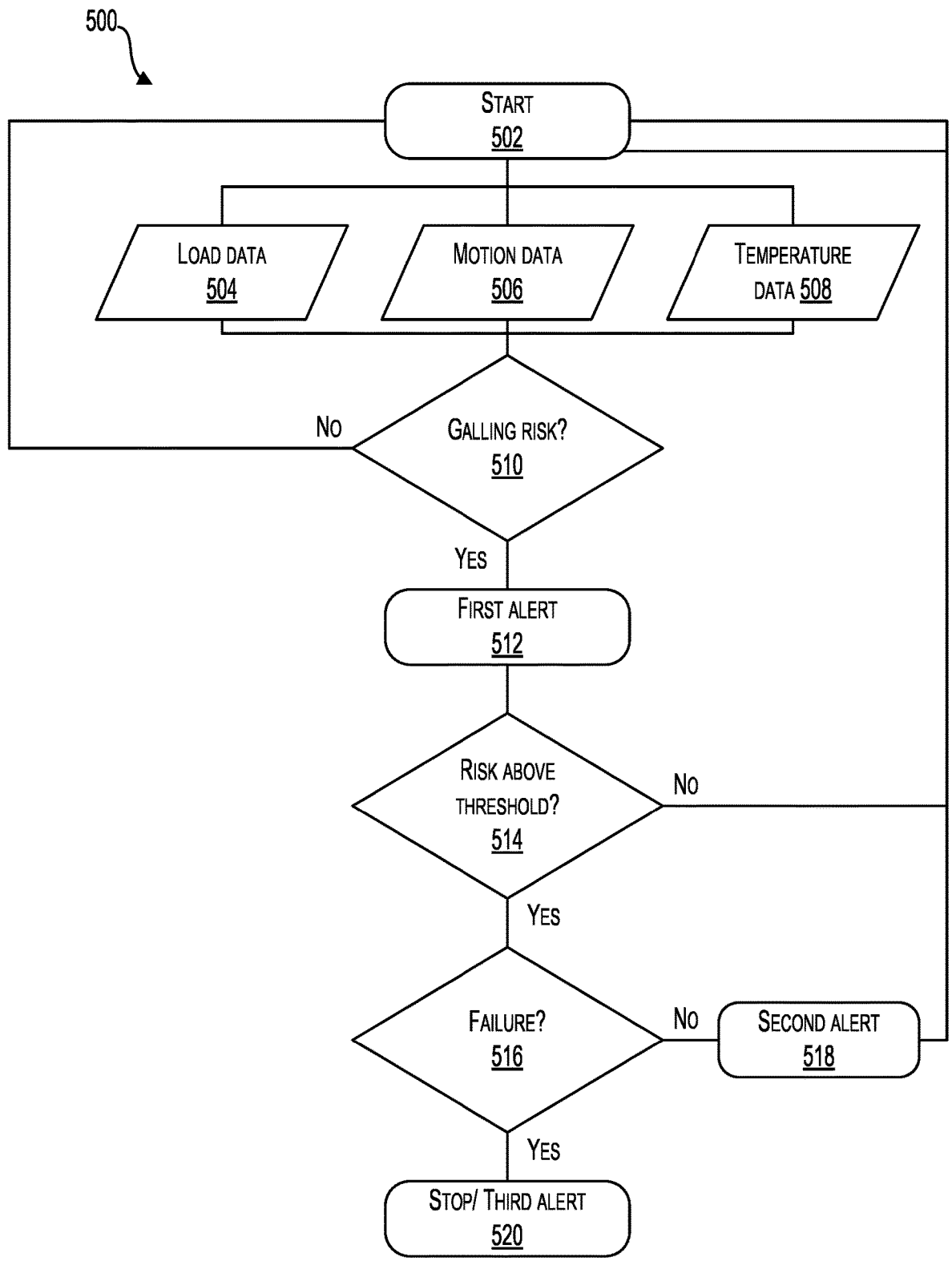
FIG. 5 illustrates a process for generating galling predictions and alerts for linkage pins of machines, according to the present disclosure.

FIG. 5 illustrates a flow chart depicting a process 500 for generating galling predictions and alerts for linkage pins of machines, according to the present disclosure. The process 500 is illustrated as a collection of steps in a logical flow diagram, which represents operations that can be implemented in hardware, software, or a combination thereof. In the context of software, the steps represent computer-executable instructions stored in memory. When such instructions are executed by, for example, the computing platform 140, such instructions cause the first computing device 138 and/or computing platform and/or additional computing devices, generally, to receive instructions corresponding to producing at least a galling risk prediction based on sensor data from sensors of the machines 102. Such computer-executable instructions can include routines, programs, objects, components, data structures, and the like that perform particular functions or implement particular abstract data types. The order in which the operations are described is not intended to be construed as a limitation, and any number of the described steps can be combined in any order and/or in parallel to implement the process.

At 502, the process 500 includes a computing device (e.g., computing platform 140) starting monitoring of the linkage joints 104 of the machines 102. The start may be in response to starting operation of the machine and/or in response to an operator or other user indicating that the system should begin monitoring. The process 500 includes receiving load data 504, motion data 506, temperature data 508, and other sensor data from sensors of the machine during operation. The sensor data may be provided over time and/or at predetermined intervals. A first threshold (e.g., a seizure threshold) may be associated with the load data 504. A second threshold (load-motion threshold) may be associated with the load data 504 and the motion data 506, such as shown and described in FIG. 4. A third threshold may be based on temperature data 508.

At 510, the process 500 includes the pin management engine 136 determining a galling risk for the linkage joint 104. The galling risk may be determined based on the sensor data and using one or more of the processes described herein, for example using load data and/or motion data and/or temperature data and also using a machine learned algorithm or manual process (such as looking up based on a plot of data and/or risk scores), or other such processes. In the event that the galling risk does not exist (e.g., is below a first threshold level) then the process 500 may return to 502 to continue monitoring during operation of the machine. In the event that the galling risk is above the first threshold (e.g., a galling risk exists) then the process 500 generates, by the computing device, a first alert at 512. The first alert may identify the linkage joint 104 associated with the alert and may also identify the risk level. The first alert may be communicated to an operator, remote station, maintenance system, or other system associated with the machine.

At 514, the process 500 includes the computing device determining if the galling risk is above a second threshold. The second threshold is higher than the first threshold. In the event that the risk is below the second threshold, the process 500 may include the computing device proceeding to monitor the operation, with the first alert generated at 512 persisting. In the event that the galling risk is above the second threshold, the computing device may determine, at 516, if galling has and/or is occurring at the joint. The determination of failure may be based on an increase in temperature data above a steady state temperature, or other indications of galling failure. In the event that galling is not determined to have occurred, a second alert may be generated at 518, the second alert indicating that the linkage pin joint is at an elevated risk for galling over the risk associated with the first alert. In some examples, the second alert may indicate that galling is imminent and may result in the operator taking remediation action and/or the computing device determining to cease operation at the linkage joint 104. In the event that galling failure is determined at 516, the process 500 may include a third alert being generated at 520 and/or stopping machine operations to prevent damage or further damage to the machine.

Figure 6:
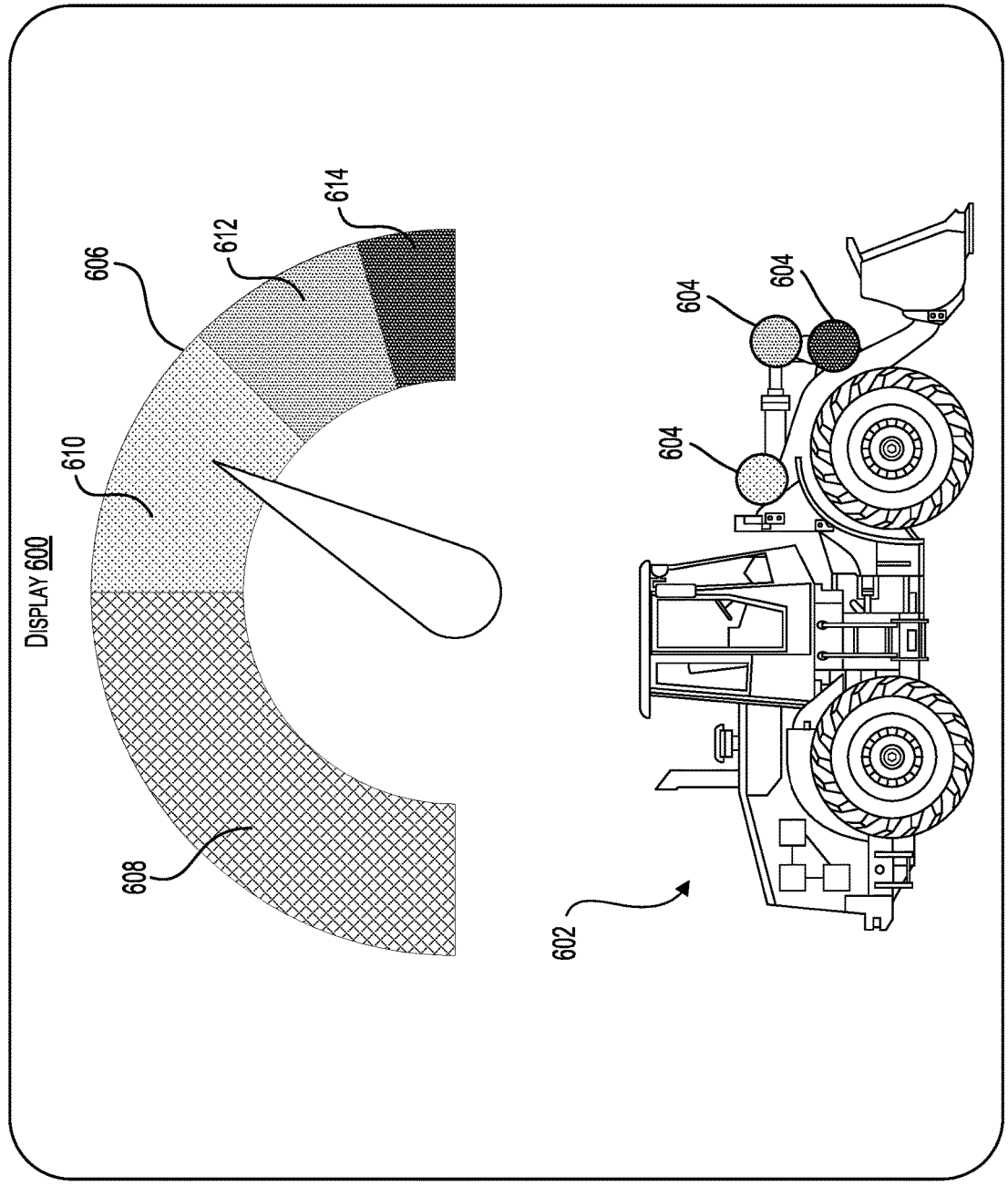
FIG. 6 illustrates a display showing galling risk predictions and scores for a machine in operation, according to the present disclosure.

FIG. 6 illustrates a display 600 showing galling risk predictions and scores for a machine in operation, according to the present disclosure. The display 600 may be a representation of a display that may be presented to an operator and/or other system associated with the machine during monitoring of the linkage joints.

In the display 600, a representation of the machine 602 is shown with markers 604 indicating locations of linkage joints on the machine 602. In some examples, multiple views or other representations may be presented to illustrate the status and/or location of the different linkage joints monitored by the system. A scale 606 within the display may be used to indicate a risk or status associated with each of the linkage joints and/or the machine overall. For instance, the display 600 may include a touchscreen display that a user may use to select a marker and have the scale 606 reflect the particular galling risk score associated with the selected linkage joint. The scale 606 is illustrated with regions 608, 610, 612, and 614 indicating increasing galling risk scores. Accordingly, at a glance, an operator may have a view of the status of the linkage joints without needing to stop operations to check each joint individually.

FIG. 7 shows an example system architecture for a computing system 700 associated with the computing platform 140. In some examples, other computing systems, such as the first computing device 138 or other on-board or off-board computing systems associated with the machines 102 can have architectures that are similar to the system architecture shown in FIG. 7. The computing system 700 can include one or more servers or other computing devices that include one or more processors 702, memory 704, and communication interfaces 706.

The processor(s) 702 can operate to perform a variety of functions as set forth herein. The processor(s) 702 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 702 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 702 can also access content and computer-executable instructions stored in the memory 704, and execute such computer-executable instructions.

The memory 704 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 702 to perform the operations described herein.

For example, the memory 704 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 702 and/or communication interface(s) 706 during execution thereof by the computing system 700. For example, the processor(s) 702 can possess local memory, which also can store program modules, program data, and/or one or more operating systems.

The memory 704 can store data and/or computer-executable instructions associated with the pin management engine 136, galling prediction engine 206, pin joint database 308, joint limits 310, and/or other elements as described herein. The memory 704 can also store other modules and data that can be utilized by the computing system 700 to perform or enable performing any action taken by the computing system 700. For example, the other modules and data 708 can include a platform, operating system, and/or applications, as well as data utilized by the platform, operating system, and/or applications.

The communication interfaces 706 can include transceivers, modems, interfaces, antennas, and/or other components that can transmit and/or receive data over networks or other data connections. In some examples, the communication interfaces 706 can be the wireless communication interfaces that the computing platform 140 can use to send sensor data, alerts, and galling risk data and to receive data.

INDUSTRIAL APPLICABILITY

The present disclosure provides systems and methods for monitoring linkage pins on machinery during operation of the machinery. Such systems and methods may be used to achieve better performance for one or more machine operations by reducing downtime and costs associated with repairs. Additionally, such systems and methods may be used to improve inefficiencies in machine operations. As noted above with respect to FIG. 1, a system 100 can use sensor data to identify galling risks associated with particular linkage joints 104 and thereby address or provide maintenance to the linkage joints preventatively rather than the more costly repair of galled joints that is expensive and time consuming. Using the sensor data from the machines, the on-board computer of the machine may monitor the status of each of the joints and alert an operator when a condition that may result in galling failure is anticipated. In this manner, the machine may be kept running with as little downtime as possible, thereby increasing worksite efficiency.

The computing platform 140 is also configured to provide such information to additional computing devices used by, for example, a maintenance system at the worksite and/or to a computing device located at, for example, a remote maintenance system. Such information can be used by, for example, the maintenance system to improve the efficiency repairs by ensuring that parts are ordered proactively when conditions for galling are initially predicted, but before replacement may be required. Thus, the example systems and methods described above can provide considerable cost and time savings and reduce the time and labor required for various activities at the worksite among other things that become apparent to one skilled in the art.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A galling prediction and notification system for a machine comprising:
   a first portion of a first machine member defining a first bore;
   a second portion of a second machine member defining a second bore;
   a linkage pin pivotally connecting the first machine member and the second machine member;
   a sensor configured to monitor the linkage pin and/or joint during operation of the machine;
   one or more processors; and
   a non-transitory computer-readable medium operably connected to the one or more processors and storing instructions that, when executed by the one or more processors, cause the one or more processors to:
receive sensor data from the sensor;
determine a first threshold for the sensor data based on the linkage pin, first machine member, and second machine member;
determine a risk score for the linkage pin, the risk score associated with a risk of galling and based on the sensor data and the threshold; and
generate an alert in response to the risk score being at or above a second threshold.

2. The galling prediction and notification system of claim 1, wherein:
the sensor comprises a temperature sensor configured to gather temperature data associated with the linkage pin; and
the threshold is based on:
a steady state operating temperature for the linkage pin; or
a rate of change limit for the linkage pin.

3. The galling prediction and notification system of claim 1, wherein:
the sensor comprises a pressure sensor configured to measure load data associated with the linkage pin and a motion sensor configured to measure motion data associated with a rotation at the linkage pin; and
the threshold is based on the load data and the motion data.

4. The galling prediction and notification system of claim 3, wherein the threshold is based on historical load data, historical motion data, and historical indications of galling at the linkage pin.

5. The galling prediction and notification system of claim 1, wherein the instructions to cause the one or more processors to determine the risk score comprise additional instructions to input the sensor data into a machine-learning algorithm configured to receive the sensor data and output risk score data, the machine-learning algorithm trained using historical sensor data annotated with indications of galling at linkage pins of machines.

6. The galling prediction and notification system of claim 1, wherein the instructions comprise additional instructions that, when executed by the one or more processors, cause the one or more processors to additionally
determine a third threshold for the sensor data; and
cause one or more operations of the machine to cease to stop motion at the linkage pin in response to the sensor data exceeding the third threshold.

7. The galling prediction and notification system of claim 1, wherein the sensor comprises at least one of a temperature sensor, a pressure sensor of a hydraulic system associated with the first machine member and the second machine member, or a motion sensor configured to detect motion at the linkage pin.

8. A method comprising:
receiving sensor data from a sensor of a machine, the sensor configured to measure the sensor data at a linkage pin rotationally connecting a first machine member with a second machine member;
determining, by a computing device of the machine, a threshold for the sensor data;
determining, by the computing device of the machine and using an algorithm that receives inputs of the sensor data and the threshold, a risk score associated with a risk of galling at the linkage pin; and
generating an alert in response to the risk score being over a second threshold.

9. The method of claim 8, wherein the sensor data comprises temperature data and wherein the threshold comprises a steady state operating temperature for the linkage pin or a threshold rate of change for the temperature data.

10. The method of claim 8, wherein the sensor comprises:
a pressure sensor configured to measure load data associated with an actuation device that connects the first machine member with the second machine member; a
a motion sensor configured to measure motion data associated with a rotation at the linkage pin, and wherein the threshold is based on the load data and the motion data.

11. The method of claim 10, wherein the threshold is based on historical load data, historical motion data, and historical indications of galling at the linkage pin.

12. The method of claim 8, wherein the algorithm comprises a machine-learning algorithm configured to receive the sensor data and output risk score data, the machine-learning algorithm trained using historical sensor data annotated with indications of galling at linkage pins of machines.

13. The method of claim 8, further comprising:
determining a third threshold for the sensor data; and
causing an actuation member connecting the first machine member with the second machine member to cease operation in response to the sensor data exceeding the third threshold.

14. The method of claim 8, wherein the sensor data comprises temperature data associated with the linkage pin, load data associated with an actuation device that connects the first machine member with the second machine member, and motion data associated with a rotation at the linkage pin.

15. A non-transitory computer-readable medium storing instructions that, when executed by one or more processors, cause the one or more processors to perform operations comprising:
receiving sensor data from a sensor of a machine, the sensor configured to measure the sensor data at a linkage pin rotationally connecting a first machine member with a second machine member;
determining, by a computing device of the machine, a threshold for the sensor data;
determining, by the computing device of the machine and using an algorithm that receives inputs of the sensor data and the threshold, a risk score associated with a risk of galling at the linkage pin; and
generating an alert in response to the risk score being over a second threshold.

16. The non-transitory computer-readable medium of claim 15, wherein the sensor data comprises temperature data and wherein the threshold comprises a steady state operating temperature for the linkage pin or a threshold rate of change for the temperature data.

17. The non-transitory computer-readable medium of claim 15, wherein the sensor data comprises:
load data associated with an actuation device that connects the first machine member with the second machine member; and
motion data associated with a rate of rotation at the linkage pin and wherein the threshold is based on historical load data, historical motion data, and historical indications of galling at the linkage pin.

18. The non-transitory computer-readable medium of claim 17, wherein determining the risk score comprises determining a first confidence score associated with the risk score and the operations further comprise:
receiving temperature data from a temperature sensor associated with the linkage pin; and determining a second risk score with a second confidence score, the second risk score based at least in part on the load data, the motion data, and the temperature data, and wherein the second confidence score is greater than the first confidence score.

19. The non-transitory computer-readable medium of claim 15, wherein the algorithm comprises a machine-learning algorithm configured to receive the sensor data and output risk score data, the machine-learning algorithm trained using historical sensor data annotated with indications of galling at linkage pins of machines.

20. The non-transitory computer-readable medium of claim 15, wherein the operations further comprise:
determining a third threshold for the sensor data; and
causing an actuation member connecting the first machine member with the second machine member to cease operation in response to the sensor data exceeding the third threshold.

* * * * *